(12) United States Patent
Peck, II et al.

(10) Patent No.: US 12,719,243 B2
(45) Date of Patent: Aug. 25, 2026

(54) BATHING CONTROL SYSTEM

(71) Applicant: Safety Tubs Company, LLC, Grand Prairie, TX (US)

(72) Inventors: William L. Peck, II, Arlington, TX (US); Cory Bates, Arlington, TX (US)

(73) Assignee: Safety Tubs Company, LLC, Grand Prairie, TX (US)

( * ) Notice: Subject to any disclaimer, the term of this patent is extended or adjusted under 35 U.S.C. 154(b) by 162 days.

(21) Appl. No.: 17/915,820

(22) PCT Filed: Mar. 31, 2021

(86) PCT No.: PCT/US2021/025074
§ 371 (c)(1),
(2) Date: Sep. 29, 2022

(87) PCT Pub. No.: WO2021/202653
PCT Pub. Date: Oct. 7, 2021

(65) Prior Publication Data

US 2023/0155357 A1 May 18, 2023

Related U.S. Application Data

(60) Provisional application No. 63/004,200, filed on Apr. 2, 2020.

(51) Int. Cl.
*H02B 1/20* (2006.01)
*E04H 4/12* (2006.01)

(52) U.S. Cl.
CPC ............... *H02B 1/20* (2013.01); *E04H 4/129* (2013.01)

(58) Field of Classification Search
CPC ........ E04H 4/129; H02B 1/20; A61H 33/005; A61H 33/0095; A61H 33/0087; A61H 2201/5082; A61H 2201/5097
USPC .................................. 4/492, 541.1, 493–494
See application file for complete search history.

(56) References Cited

U.S. PATENT DOCUMENTS 2,301,761 A * 11/1942 Thompson ............. A47K 3/022 4/590
4,404,697 A * 9/1983 Hatcher ............... A61H 33/005 4/492
6,747,367 B2 6/2004 Cline et al.
10,465,676 B2 * 11/2019 Robol ..................... F04B 19/00
10,976,713 B2 * 4/2021 Potucek .................. H04L 41/22
11,213,455 B2 * 1/2022 Laflamme ............ A61H 33/005

(Continued)

OTHER PUBLICATIONS

PCT/US2021/025074 International Search Report and Written Opinion dated Jun. 23, 2021.

*Primary Examiner* — David P Angwin
*Assistant Examiner* — William R Klotz
(74) *Attorney, Agent, or Firm* — Morrison & Foerster LLP

(57) ABSTRACT

A bathing apparatus comprising a whirlpool pump; a heater; an air blower; a drain pump; and an electric module, wherein the electric module is configured to receive electric power from an electric power line and to distribute electric power to the whirlpool pump, heater, air blower, and drain pump, when electric power is distributed to one of the heater or the air blower, electric power cannot be distributed to the other of the heater or the air blower, and when electric power is distributed to the drain pump, electric power cannot be distributed to the whirlpool pump, the heater, and the air blower.

3 Claims, 1 Drawing Sheet

(56) References Cited

U.S. PATENT DOCUMENTS

| | | | | |
|---|---|---|---|---|
| 11,720,085 | B2 * | 8/2023 | Roy | G01K 3/005<br>700/275 |
| 2004/0081559 | A1 | 4/2004 | Jolley et al. | |
| 2004/0129790 | A1 * | 7/2004 | Booth | E04H 4/129<br>237/56 |
| 2004/0148693 | A1 | 8/2004 | Anderson | |
| 2005/0228544 | A1 * | 10/2005 | Bauer | A61H 33/00<br>700/282 |
| 2006/0115247 | A1 | 6/2006 | Tran | |
| 2016/0136043 | A1 * | 5/2016 | Lin | E04H 4/0025<br>4/492 |
| 2017/0215261 | A1 * | 7/2017 | Potucek | H02J 13/00007 |
| 2017/0367928 | A1 * | 12/2017 | Tempas | A61H 33/6063 |
| 2019/0053978 | A1 * | 2/2019 | Stout | A61H 33/027 |
| 2019/0374431 | A1 | 12/2019 | Laflamme | |
| 2021/0234320 | A1 * | 7/2021 | Campbell | A61H 33/6026 |

* cited by examiner

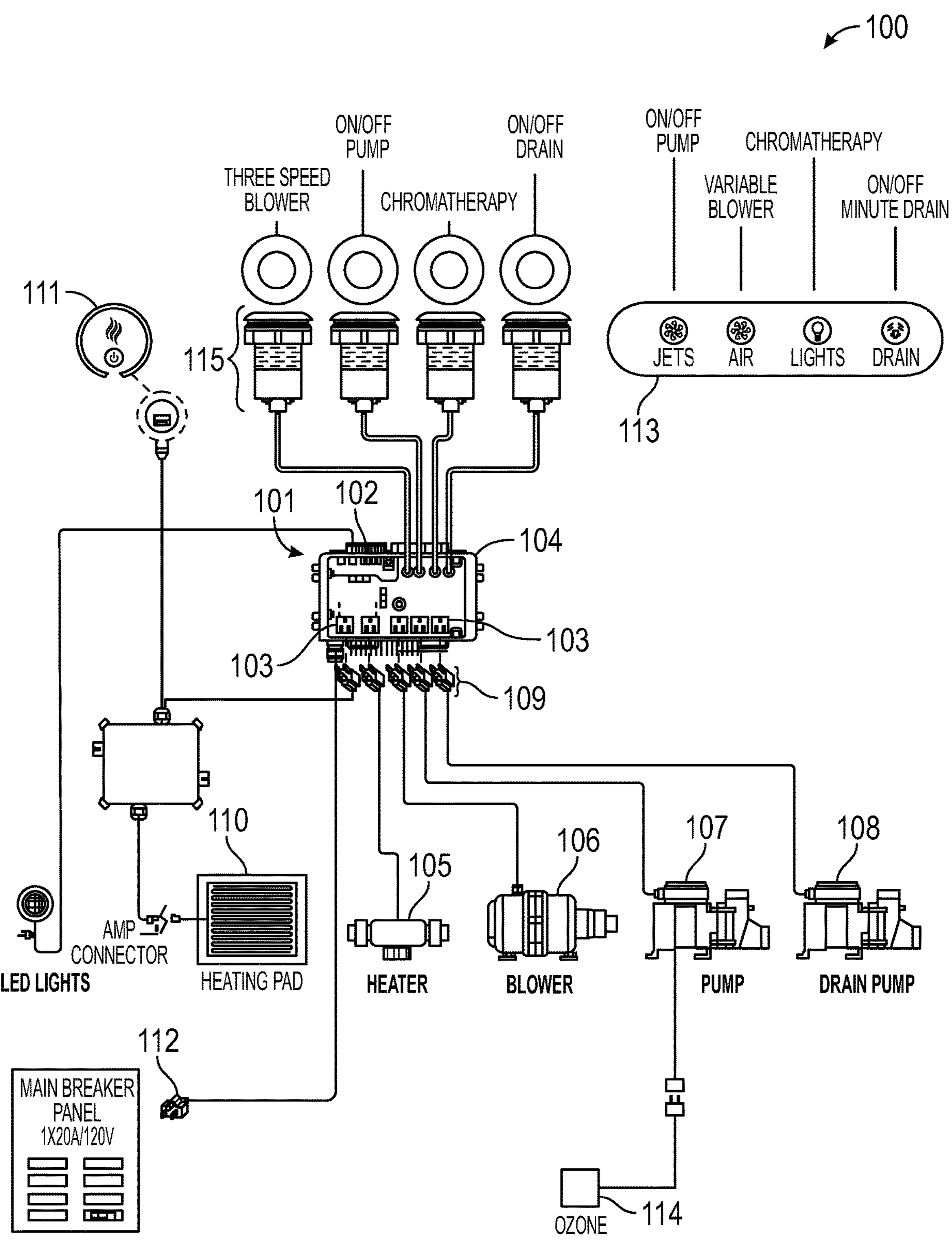
100
THREE SPEED BLOWER
ON/OFF PUMP
CHROMATHERAPY
ON/OFF DRAIN
ON/OFF PUMP
VARIABLE BLOWER
CHROMATHERAPY
ON/OFF MINUTE DRAIN
111
115
JETS
AIR
LIGHTS
DRAIN
113
101
102
104
103
103
109
110
105
106
107
108
AMP CONNECTOR
LED LIGHTS
HEATING PAD
HEATER
BLOWER
PUMP
DRAIN PUMP
112
MAIN BREAKER PANEL 1X20A/120V
OZONE
114

BATHING CONTROL SYSTEM

The disclosure relates to electronic control systems for spas, baths, or hot tubs.

BACKGROUND

Bathing installations, such as spas, whirlpool baths, and hot tubs, typically include electrical devices or systems to operate components such as pumps, air blowers, lights, water heaters, etc. Such electrical devices or systems are complex, as the various components draw significant amounts of electric power.

Desired is a simplified electrical system for bathing installations. A simplified electrical system may operate with a single external electric line.

SUMMARY

Accordingly, disclosed is a bathing apparatus comprising a whirlpool pump; a heater; an air blower; a drain pump; and an electric module, wherein the electric module is configured to receive electric power from an electric power line and to distribute electric power to the whirlpool pump, heater, air blower, and drain pump, when electric power is distributed to one of the heater or the air blower, electric power cannot be distributed to the other of the heater or the air blower, and when electric power is distributed to the drain pump, electric power cannot be distributed to the whirlpool pump, the heater, and the air blower.

Also disclosed is an electric module for a bathing apparatus, wherein the electric module is configured to receive electric power from an electric power line and to distribute electric power to a whirlpool pump, a heater, an air blower, and a drain pump, when electric power is distributed to one of the heater or the air blower, electric power cannot be distributed to the other of the heater or the air blower, and when electric power is distributed to the drain pump, electric power cannot be distributed to the whirlpool pump, the heater, and the air blower.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 1 shows a layout for electrically powered components of a bathing installation, according to one embodiment

DETAILED DISCLOSURE

A present bathing apparatus, for example, a whirlpool bath, a walk-in bath, therapy tub, a spa, a hot tub, and the like, will comprise a whirlpool pump, a heater, an air blower, a drain pump, and an electric module or junction box.

FIG. 1 depicts layout 100 for electrically powered components of a bathing installation, according to an embodiment. Shown are electric module 101, containing controller 102, and 3-prong outlets 103. Electric module 101 is contained in housing 104. Housing 104 is shown in an open position; internal features are not visible when housing is sealed with a cover. Water heater 105, air blower 106, whirlpool pump 107, and drain pump 108 are configured to be electrically connected to module 101 via 3-prong plugs 109. Heating pad 110 for a heated seat is configured to be connected to electric module 101 via a 3-prong plug 109 and actuated via touch button 111. Ozone generator 114 may be coupled to pump 107. Electric module 101 is configured to connect to a 120V/20 A GFI power outlet (not shown) via NEMA plug 112. Air push button array 115 contains buttons configured to actuate blower 106, pump 107, drain 108, and lighting. In an alternate embodiment, bathing installation components may be actuated via user interface 113, which is configured to be in wireless communication with controller 102. Heater 105 requires about 11 amps, blower 106 requires about 7.4 amps, pump 107 requires about 7.8 amps, and drain pump 108 requires about 5.6 amps.

In some embodiments, a whirlpool pump is associated with an electric motor, and is configured to recycle bathing water by drawing in water from the bath, compressing it, and forcing it out through jets positioned in the bath, thereby creating a whirlpool effect. In some embodiments, a whirlpool pump may require from any of about 7.0 amps, about 7.2 amps, about 7.4 amps, or about 7.6 amps, to any of about 7.8 amps, about 8.0 amps, about 8.2 amps, about 8.4 amps, about 8.6 amps, or more, of electric power.

In some embodiments, an air blower may also have a heating function that heats air and helps maintain the bath temperature. An air blower may be configured to direct air through air jets positioned in the bath, i.e., in walls of the tub. In some embodiments, an air blower may direct air through separate jets than whirlpool jets. In other embodiments, an air blower may direct air through the whirlpool jets together with recirculating water. In some embodiments, an air blower may require from any of about 5.4 amps, about 5.6 amps, about 5.8 amps, or about 6.0 amps, to any of about 6.2 amps, about 6.4 amps, about 6.6 amps, about 6.8 amps, about 7.0 amps, about 7.2 amps, about 7.4 amps, about 7.6 amps, about 7.8 amps, about 8.0 amps, about 8.2 amps, or more of electric power.

In some embodiments, a drain pump, or "quick drain" may require from any of about 4.8 amps, about 4.9 amps, about 5.0 amps, about 5.1 amps, or about 5.2 amps, to any of about 5.3 amps, about 5.4 amps, about 5.5 amps, about 5.6 amps, about 5.7 amps, about 5.8 amps, about 5.9 amps, about 6.0 amps, about 6.1 amps, about 6.2 amps, or more of electric power.

In some embodiments, a heater (electric heater) may comprise a resistive heater element. A heater may be connected in-line in a water flow recirculating flow line. In some embodiments, a heater may require from any of about 9.0 amps, about 9.2 amps, about 9.4 amps, about 9.6 amps, or about 9.8 amps, to any of about 10.0 amps, about 10.2 amps, about 10.4 amps, about 10.6 amps, about 10.8 amps, about 11.0 amps, about 11.2 amps, about 11.4 amps, about 11.6 amps, about 11.8 amps, about 12.0 amps, or more of electric power.

In some embodiments, a present bathing apparatus comprises a bathing function and a drain function. In some embodiments, the bathing function comprises the whirlpool pump and the air blower; and the drain function comprises the drain pump. In some embodiments, the bathing function may comprise the whirlpool pump, and the air blower, and/or a heating pad for a heated seat, and/or lighting, and/or an ozone generator, and or electrically powered valves.

In some embodiments, electric power for lighting and a heated seat may be independent of a bathing function and a drain function, that is, lighting and heated seat may remain "on" regardless of which other components are being powered.

In some embodiments, the bathing apparatus may be configured so that electric power may be distributed to the bathing function or the drain function, wherein only one of the bathing function or the drain function may be operated at one time.

In some embodiments, a drain function may require from any of about 4.8 amps, about 4.9 amps, about 5.0 amps, about 5.1 amps, or about 5.2 amps, to any of about 5.3 amps, about 5.4 amps, about 5.5 amps, about 5.6 amps, about 5.7 amps, about 5.8 amps, about 5.9 amps, about 6.0 amps, about 6.1 amps, about 6.2 amps, or more of electric power.

In some embodiments, a bathing function may require from any of about 13.2 amps, about 13.4 amps, about 13.6 amps, about 13.8 amps, about 14.0 amps, about 14.2 amps, about 14.4 amps, about 14.6 amps, or about 14.8 amps, to any of about 15.0 amps, about 15.2 amps, about 15.4 amps, about 15.6 amps, about 15.8 amps, or about 16.0 amps of electric power.

In one embodiment, a feature of the present bathing apparatus is that only one 120V/20 amp power line may be required to power the entire apparatus. In some embodiments, this may be accomplished by configuring an electric control module so that when electric power is distributed to one of a water heater or an air blower, electric power may not be distributed to the other of the water heater or the air blower; and when electric power is distributed to a drain pump, electric power may not be distributed to a whirlpool pump, the heater, and the air blower.

In some embodiments, when electric power is distributed to any of a whirlpool pump, a water heater or an air blower, electric power may not be distributed to a drain pump.

In some embodiments, the bathing apparatus may comprise a controller, or microcontroller, or printed circuit board, configured to be in electrical communication with the electric module and to control electrical switching from one function or system to another. Terms like "distributed", "not distributed", "allow", "disallow", "electrical switching", or "switching" may be performed via on/off commands generated by a controller to an electric switch or relay. Commands generated by a controller may be in response to a user-generated command, for example via a button, a remote control, a voice command, a user interface, etc. Electrical communication may be wired or wireless.

In a present bathing apparatus, when electric power is distributed to one of the heater or the air blower, electric power cannot be distributed to the other of the heater or the air blower. In some embodiments, controller logic and controller instructions prevents both a heater and an air blower to be "on" or to be operated simultaneously, which may be considered a logic-controlled interlock.

In some embodiments, the electric module may be positioned in a housing. The electric module may comprise a 3-prong outlet for each of the whirlpool pump, heater, air blower, and drain pump to plug into with a 3-prong plug, e.g. a NEMA plug. In some embodiments, the electric module may comprise a controller. In other embodiments, a controller may positioned outside of the electric module, while still in electrical communication with it.

In some embodiments, the electric module may be coupled to one or more buttons, for instance air push buttons, configured to actuate one or more components of the bathing apparatus, including a whirlpool pump, air blower, drain pump, and lighting (chromatherapy). Air push buttons are configured to switch components on and off. The controller is configured to recognize an operating condition of a component (on or off).

Heater operation is controlled via a pressure switch and a high limit switch. In some embodiments, a heater will power up when an operating water pressure reaches greater than about 5 psi. In some embodiments, a heater will turn off when a water temperature reaches about 102 degrees F. A heater is in electrical communication with the controller and is configured to be switched on or off via the controller.

In some embodiments, the electric module may be in electrical communication with a user interface comprising one or more touch pads associated with one or more components of the bathing apparatus. Upon receiving a touch command from a user interface, the controller may operate an electronic switch or relay to operate a bathing component.

Some bathing systems are described for example in US2012/0181867 and U.S. Pat. Nos. 6,084,218, 7,859,813, and 8,406,932.

Following are some non-limiting embodiments of the disclosure.

In a first embodiment, disclosed is bathing apparatus comprising a whirlpool pump; a heater; an air blower; a drain pump; and an electric module, wherein the electric module is configured to receive electric power from an electric power line and to distribute electric power to the whirlpool pump, heater, air blower, and drain pump, when electric power is distributed to one of the heater or the air blower, electric power cannot be distributed to the other of the heater or the air blower, and when electric power is distributed to the drain pump, electric power cannot be distributed to any of the whirlpool pump, the heater, and the air blower.

In a second embodiment, disclosed is a bathing apparatus according to the first embodiment, wherein when electric power is distributed to any of the whirlpool pump, the heater, and the air blower, electric power cannot be distributed to the drain pump. In a third embodiment, disclosed is a bathing apparatus according to embodiments 1 or 2, wherein when electric power is distributed to the whirlpool pump, electric power may be distributed to one of the heater or the air blower.

In a fourth embodiment, disclosed is a bathing apparatus according to any of the preceding embodiments, comprising a controller, wherein the controller is in electrical communication with the electric module, and wherein the controller is configured to allow or disallow electric power distribution to any of the whirlpool pump, the heater, the air blower, and the drain pump.

In a fifth embodiment, disclosed is a bathing apparatus according to any of the preceding embodiments, wherein the electric module is positioned in a housing.

In a sixth embodiment, disclosed is a bathing apparatus according to any of the preceding embodiments, wherein the electric power line is a 20 amp line. In a seventh embodiment, disclosed is a bathing apparatus according to any of the preceding embodiments, wherein the electric module is configured to receive power from a single electric power line. In an eighth embodiment, disclosed is a bathing apparatus according to any of the preceding embodiments, comprising a single electric power line.

In a ninth embodiment, disclosed is a bathing apparatus according to any of the preceding embodiments, comprising a push button array or a user interface in electrical communication with the electric module, wherein the push button array and user interface comprise a whirlpool pump button associated with the whirlpool pump, an air blower button associated with the air blower, and drain button associated with the drain pump.

In a tenth embodiment, disclosed is a bathing apparatus according to the ninth embodiment, wherein the push button array or user interface are in electrical communication with the electric module and a controller, and wherein the controller is configured to switch electric power between the heater and the air blower upon receiving a signal generated via user input.

In an eleventh embodiment, disclosed is a bathing apparatus according to the tenth embodiment, wherein when a user operates the drain button, the controller switches on electric power to the drain pump and switches off electric power to the whirlpool pump, the heater, and the air blower.

In a twelfth embodiment, disclosed is a bathing apparatus according to any of embodiments 9 to 11, wherein when a user operates the whirlpool pump button or the air blower button, the controller switches off electric power to the drain pump.

In a thirteenth embodiment, disclosed is a bathing apparatus according to any of the preceding embodiments, comprising a heated seat, wherein the electric module distributes electric power to the heated seat. In a fourteenth embodiment, disclosed is a bathing apparatus according to any of the preceding embodiments, comprising one or more lighting elements, wherein the electric module distributes electric power to the one or more lighting elements. In a fifteenth embodiment, disclosed is a bathing apparatus according to any of the preceding embodiments, comprising an ozone generator, wherein the electric module distributes electric power to the ozone generator. In a sixteenth embodiment, disclosed is a bathing apparatus according to any of the preceding embodiments, comprising one or more electronic valves, wherein the electric module distributes electric power to the one or more electronic valves.

Following is a further set of embodiments.

In a first embodiment, disclosed is an electric module for a bathing apparatus, wherein the electric module is configured to receive electric power from an electric power line and to distribute electric power to a whirlpool pump, a heater, an air blower, and a drain pump, when electric power is distributed to one of the heater or the air blower, electric power cannot be distributed to the other of the heater or the air blower, and when electric power is distributed to the drain pump, electric power cannot be distributed to the whirlpool pump, the heater, and the air blower.

In a second embodiment, disclosed is an electric module according to the first embodiment, wherein when electric power is distributed to any of the whirlpool pump, the heater, and the air blower, electric power cannot be distributed to the drain pump.

In a third embodiment, disclosed is an electric module according to the first or second embodiments, wherein when electric power is distributed to the whirlpool pump, electric power may be distributed to one of the heater or the air blower.

In a fourth embodiment, disclosed is an electric module according to any of the preceding embodiments, comprising a controller, wherein the controller is in electrical communication with the electric module, and wherein the controller is configured to allow or disallow electric power distribution to the whirlpool pump, the heater, the air blower, and the drain pump.

In a fifth embodiment, disclosed is an electric module according to any of the preceding embodiments, wherein the electric module is positioned in a housing.

In a sixth embodiment, disclosed is an electric module according to any of the preceding embodiments, wherein the electric power line is a 20 amp line. In a seventh embodiment, disclosed is an electric module according to any of the preceding embodiments, wherein the electric module is configured to receive power from a single electric power line.

In an eighth embodiment, disclosed is an electric module according to any of the preceding embodiments, wherein the electric module is configured to be in electrical communication with a push button array or a user interface, the push button array and user interface comprising a whirlpool pump button associated with the whirlpool pump, an air blower button associated with the air blower, and drain button associated with the drain pump.

In a ninth embodiment, disclosed is an electric module according to the seventh embodiment, wherein the push button array or user interface is in electrical communication with the electric module and a controller, and wherein the controller is configured to switch electric power between the heater and the air blower upon receiving a signal generated via user input.

In a tenth embodiment, disclosed is an electric module according to the eighth embodiment, wherein the electric module and the controller are positioned in a housing.

In an eleventh embodiment, disclosed is an electric module according to any of embodiments 8 to 10, wherein when a user operates the drain button, the controller switches on electric power to the drain pump and switches off electric power to the whirlpool pump, the heater, and the air blower.

In a twelfth embodiment, disclosed is a bathing apparatus according to any of embodiments 8 to 11, wherein when a user operates the whirlpool pump button or the air blower button, the controller switches off electric power to the drain pump.

In a thirteenth embodiment, disclosed is an electric module according to any of the preceding embodiments, wherein the electric module is configured to distribute electric power to a heated seat. In a fourteenth embodiment, disclosed is an electric module according to any of the preceding embodiments, wherein the electric module is configured to distribute electric power to one or more lighting elements. In a fifteenth embodiment, disclosed is an electric module according to any of the preceding embodiments, wherein the electric module is configured to distribute electric power to an ozone generator. In a sixteenth embodiment, disclosed is an electric module according to any of the preceding embodiments, wherein the electric module is configured to distribute electric power to one or more valves.

Features described in connection with one embodiment of the disclosure may be used in conjunction with other embodiments, even if not explicitly stated above.

The term "coupled" may mean that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "electrical communication" may be synonymous with "electrically coupled" or "electrically connected" and may mean an element may send or receive electricity or electronic signals to another element, either via a wired connection or a wireless connection. The term "associated with" may mean "coupled", i.e. "electrically coupled".

The term "towards" in reference to a of point of attachment or a location, may mean at exactly that location or point or, alternatively, may mean closer to that point or location than to another distinct point or location, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Embodiments of the disclosure include any and all parts and/or portions of the embodiments, claims, description and figures. Embodiments of the disclosure also include any and all combinations and/or sub-combinations of embodiments.

All U.S. patent applications, published patent applications and patents referred to herein are hereby incorporated by reference.

The invention claimed is:

1. A method for operating a bathing apparatus comprising receiving a user input via a push button array or user interface comprising a whirlpool pump button associated with a whirlpool pump, an air blower button associated with an air blower comprising a heating function to heat air and to maintain a bath temperature, and a drain button associated with a drain pump, receiving electric power from a single 20 amp electric power line, controlling distribution of the electric power to the whirlpool pump, a heater, the air blower, and the drain pump by implementing a logic-controlled interlock, wherein controlling the distribution of the electric power comprises:

when electric power is distributed to one of the heater or the air blower, preventing electric power distribution to the other of the heater or the air blower, when electric power is distributed to the whirlpool pump, allowing electric power distribution to one of the heater or the air blower, when electric power is distributed to the drain pump, preventing electric power distribution to any of the whirlpool pump, the heater, and the air blower, when electric power is distributed to any of the whirlpool pump, the heater, and the air blower, preventing electric power distribution to the drain pump, when the user input indicates operation of the drain button, switching on electric power to the drain pump and switches off electric power to the whirlpool pump, the heater, and the air blower, and when the user input indicates operation of the whirlpool pump button or the air blower button, switching off electric power to the drain pump.

2. The method of claim 1, further comprising controlling distribution of the electric power to one or more devices selected from the group consisting of a heated seat, lighting elements, an ozone generator, and electronic valves.

3. The method of claim 1, further comprising controlling distribution of the electric power to a heated seat and lighting elements independently of the whirlpool pump, heater, air blower, and drain pump.

* * * * *